US009269120B2

(12) United States Patent
Kaburlasos et al.

(10) Patent No.: US 9,269,120 B2
(45) Date of Patent: Feb. 23, 2016

(54) DYNAMICALLY REBALANCING GRAPHICS PROCESSOR RESOURCES

(71) Applicant: Intel Corporation, Santa Clara, CA (US)

(72) Inventors: Nikos Kaburlasos, Lincoln, CA (US); Eric C. Samson, Folsom, CA (US); Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 13/669,576

(22) Filed: Nov. 6, 2012

(65) Prior Publication Data

US 2014/0125679 A1 May 8, 2014

(51) Int. Cl.
*G06T 1/20* (2006.01)
*G06T 1/00* (2006.01)
*G06F 15/00* (2006.01)

(52) U.S. Cl.
CPC ........................................ *G06T 1/20* (2013.01)

(58) Field of Classification Search
CPC .................. G06F 15/00; G06F 15/16–15/161; G06F 15/80–15/8092; G06T 1/00–1/0092; G06T 1/20
USPC .................................. 345/501, 502, 506, 505
See application file for complete search history.

(56) References Cited

U.S. PATENT DOCUMENTS

| 7,075,541 | B2 | 7/2006 | Diard |
| 7,343,508 | B2 | 3/2008 | Khodorkovsky |
| 8,102,398 | B2 | 1/2012 | Bajic et al. |
| 8,199,158 | B2 * | 6/2012 | Samson et al. ................ 345/519 |
| 8,284,205 | B2 * | 10/2012 | Miller et al. ................... 345/502 |
| 2002/0033737 | A1 * | 3/2002 | Staszewski et al. ............. 331/17 |
| 2009/0096797 | A1 * | 4/2009 | Du et al. ........................ 345/506 |
| 2009/0167770 | A1 * | 7/2009 | Navale et al. .................. 345/501 |
| 2011/0148887 | A1 * | 6/2011 | Chong et al. ................... 345/501 |

FOREIGN PATENT DOCUMENTS

WO      2005086095      9/2005

OTHER PUBLICATIONS

PCT International Search Report and Written Opinion issued in corresponding PCT/US2013/048037 dated Nov. 1, 2013, (11 pages).
Office Action dated Mar. 19, 2015 by the TW IPO in corresponding TW application No. 102139958 [w/English translation], (14 pages).
TW Search Report issued in corresponding TW102139958 dated Mar. 9, 2015 [w/English translation], (2 pages).

* cited by examiner

*Primary Examiner* — Jacinta M Crawford
(74) *Attorney, Agent, or Firm* — Trop, Pruner & Hu, P.C.

(57) ABSTRACT

According to some embodiments, performance bottlenecks that arise in particular resources within a graphic processor unit may be alleviated by dynamically rebalancing workloads among the resources, with the goal of removing the current performance bottleneck, while at the same time maintaining power dissipation within a currently allocated power budget. In some embodiments this may be achieved by defining a separate clock domain for each of the plurality of graphics processor resources whose performance may then be rebalanced.

22 Claims, 4 Drawing Sheets

DYNAMICALLY REBALANCING GRAPHICS PROCESSOR RESOURCES

BACKGROUND

This relates generally to graphics processors.

Graphics processors are generally responsible for generating the displays that appear in computer systems. Each graphics processor core may include a number of different resources that perform different types of operations. For example a graphics core may include fixed function logic that implements the stages of a DirectX (DX) or other rendering pipeline, texture samplers that process textures, execution units that perform arithmetic and math operations, pixel backends that perform pixel fill and blend operations, etc.

Workloads that execute on a graphics core vary in their characteristics and may stress different resources available in the graphics core to different degrees, creating performance bottlenecks arising because of overloading of one resource relative to other resources. For example some workloads may be texture intensive and they create a performance bottleneck in the texture samplers. Other workloads may require intensive math operations creating a performance bottleneck in the execution units.

Furthermore the characteristics of a particular workload may change over time leading to performance bottlenecks that move dynamically from one resource to another.

BRIEF DESCRIPTION OF THE DRAWINGS

Some embodiments are described with respect to the following figures.

DETAILED DESCRIPTION

According to some embodiments, performance bottlenecks that arise in particular resources within a graphic processor unit may be alleviated by dynamically rebalancing workloads among the resources, with the goal of removing the current performance bottleneck, while at the same time maintaining power dissipation within a currently allocated power budget. In some embodiments this may be achieved by defining a separate clock domain for each of the plurality of graphics processor resources whose performance may then be rebalanced.

By defining utilization metrics that quantify the current degree of utilization of each of a plurality of graphics processor resources, rebalancing may be implemented on a real time basis, given that work that is often scheduled on a particular graphics processor resource by submitting work requests into a queue that is specific to that resource. One example of a resource utilization metric is to the state of the work queue for a particular resource. That is, the more full or empty is the queue, the more or less overutilized is that resource and the greater the need for a rebalancing. However other utilization metrics may be utilized as well.

Figure 1:
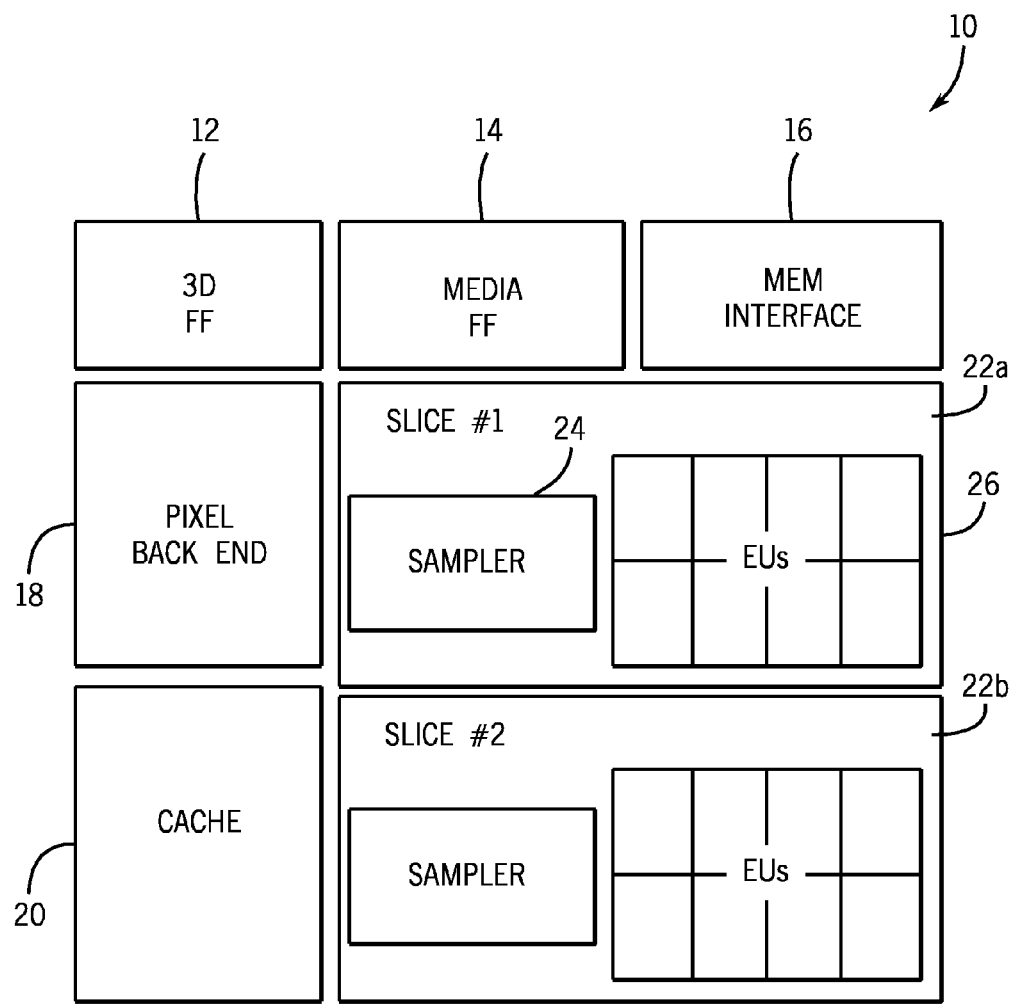
FIG. 1 is a schematic depiction of a graphics processing unit core according to one embodiment.

Referring to FIG. 1, a graphics processing unit core 10 resources that can be rebalanced in some embodiments, include three-dimensional fixed functions 12, pixel back-end 18, and compute slices 22a and 22b. Each compute slice 22 includes a sampler 24 and a number of execution units 26. When a workload executes on a graphics core, a performance bottleneck may be created in any of the resources available on a graphics core, depending on the characteristics of that workload.

The graphics processor core may also include a cache 20, a media fixed function unit 14 and the memory interface 16.

In accordance with some embodiments, processing power can be dynamically transferred from underused to overused resources in the graphics core. This may alleviate performance bottlenecks and improve overall performance within available power budgets in some embodiments.

Some graphics processor cores are targeted for very power limited market segments. These are often designs which operate in their frequency scaled region most of the time, where the graphics processor core operates at its minimum operating voltage, and clock frequency can decrease or increase within certain limits without having to change operating voltage as well.

Thus, in some embodiments, higher clock frequencies and greater power budget are allocated to graphics processor resources that are heavily utilized and lower clock frequencies and power budget are allocated to resources that are relatively more lightly utilized. The allocated clock frequency of each graphics processor resource may be increased or decreased over time, depending on how busy the resource is at any given point in time.

In practice this allocation may be achieved by a local decision taken by lightly utilized resources to lower their own clock frequency in one embodiment. As a result, the power dissipation of these more lightly utilized resources is reduced, thereby reducing the power dissipation of the overall graphics core below its currently allocated budget. Also, more heavily utilized resources in the graphics processor core may raise their clock frequency and fill the graphics processor core power budget back to allocated levels. At the end of a short transition period, the busier graphics resources end up using a higher clock frequency than before, relative to less busy graphics processor resources.

Different clock domains in the graphics processor core can be defined and managed by using a separate clock frequency for each graphics processor resource. Each clock frequency may come from a phase locked loop dedicated to a particular resource or from a single phase lock loop or a few phase lock loops that can divide a baseline clock frequency by various ratios. If all resources in the graphics processor core are powered from the same voltage regulator, then the fastest clock frequency required by the busiest graphics processor resource determines the voltage setting of the voltage regulator.

Alternatively, multiple voltage regulators, external to the core or integrated in the same chip with the core, may be used for different graphics processor resources, enabling some of the resources to raise their voltage and frequency independently, as needed, without forcing other graphics processor resources to operate at higher voltages as well. As a result, the busier graphics processor resources operate at a higher voltage and frequency than less busy graphics processor resources.

Another way of producing different clock domains is utilizing a single voltage domain and a single baseline clock frequency for all resources in the core, while allowing each resource to generate a lower effective local clock frequency by clock edge skipping. In clock edge skipping, a desired number of clock edges are masked. For example, masking two out three clock edges essentially divides the clock frequency by three.

For graphics processor cores that operate entirely inside their frequency scaled region most of the time, the baseline graphics clock frequency can rise and fall within certain limits while the operational voltage remains unchanged at its minimum value. Such graphics processor cores have significant room to rebalance the local clock frequencies of their resources without having to raise the voltage of operation above the minimum voltage, for most common sustained workloads and usage models.

Each resource in a graphics processor core may track its own utilization and make a decision to reduce its local clock frequency when utilization is low in one embodiment. Alternatively, there may be a centralized resource that tracks utilization of different resources and makes decisions on the local clock frequency of each resource.

If the power dissipation of the overall graphics processor core is dropped as a result of some resources reducing their clock frequency, then some power budget headroom is been created for the overall graphics core. This allows for an increase of the clock frequency of all resources, including those that are currently performance bottlenecks. Allowing an increase in clock frequency for performance bottlenecks raises the performance level delivered by the graphics processor core as a whole. Raising the resource clock frequencies may, in some cases, also requiring the voltage of the overall graphics processor core or, in the case of multiple voltage regulators are used, of the busiest resources in the graphics processor core to change. However, many power limited designs which operate mostly inside their frequency scaled region do not need to raise the voltage most of the time.

Figure 2:
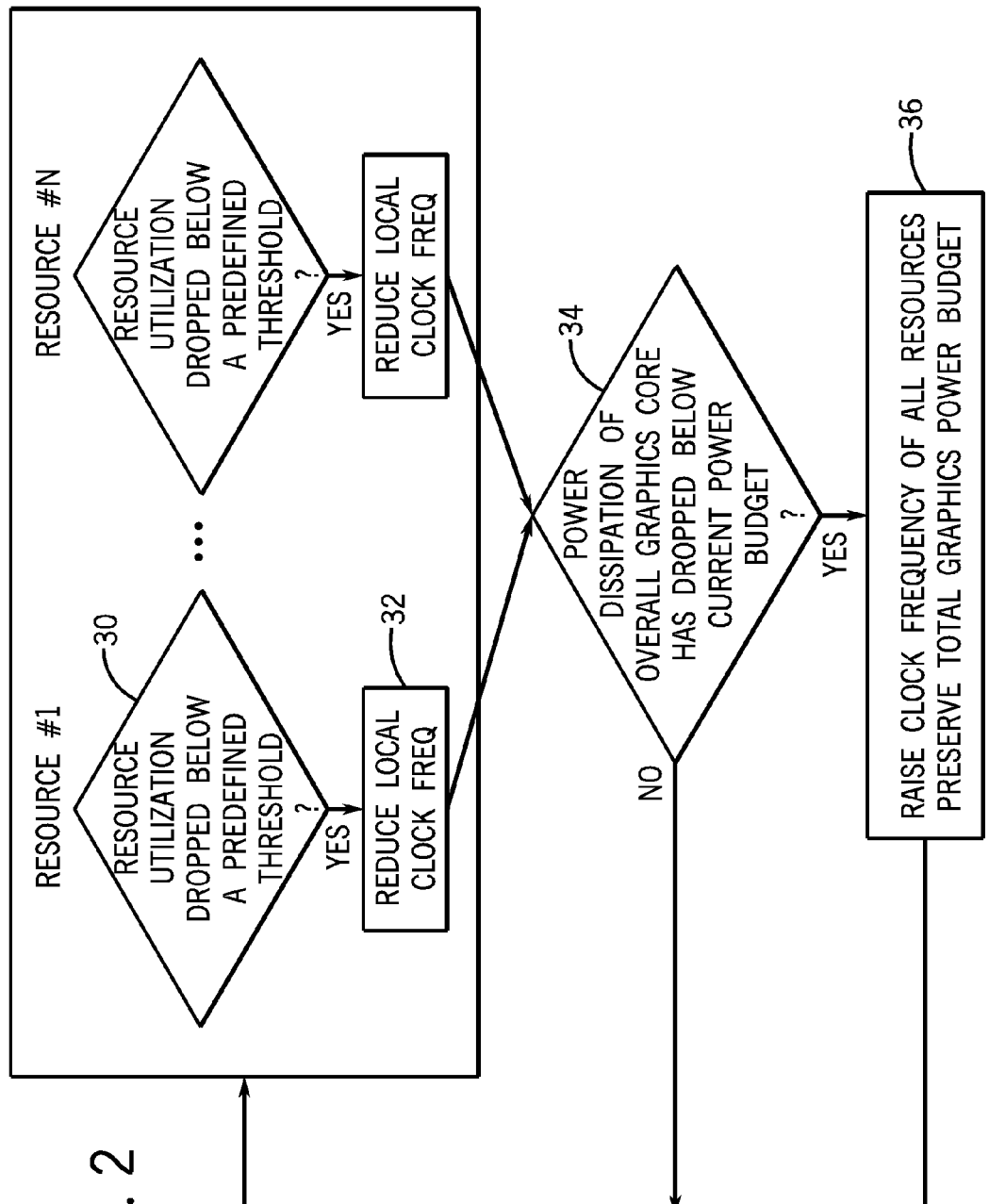
FIG. 2 is a flow chart for one embodiment to the present invention.

In accordance with one embodiment shown in FIG. 2, a rebalancing scheme may be implemented in software, firmware and/or hardware. In software and firmware embodiments it may be implemented by computer executed instructions stored in one or more non-transitory computer readable media such as a magnetic, optical or semiconductor storages.

In FIG. 2, a number of different graphics processor resources are depicted. Each resource may check at diamond 30 whether the resource utilization has dropped below a predefined threshold. If not, the resource simply continues to periodically check whether the resource utilization has dropped below some predefined threshold.

Conversely if the resource utilization has dropped below a threshold then the local clock frequency may be reduced as indicated in block 32.

Then periodically a check (diamond 34) for all the resources may determine whether power dissipation of the overall graphics core has dropped below current budgeted levels. If not, the flow iterates.

Otherwise, the clock frequency of all the resources may be raised (block 36) preserving total graphics power budget. Then when the flow iterates back again to blocks 30 for each resource, those resources may progressively decrease their local clock frequencies as appropriate.

In other embodiments a check may determine whether utilization has increased above a predefined threshold and if such case, increase the local clock frequency. Other schemes may also be implemented according to some embodiments of the present invention.

Figure 3:
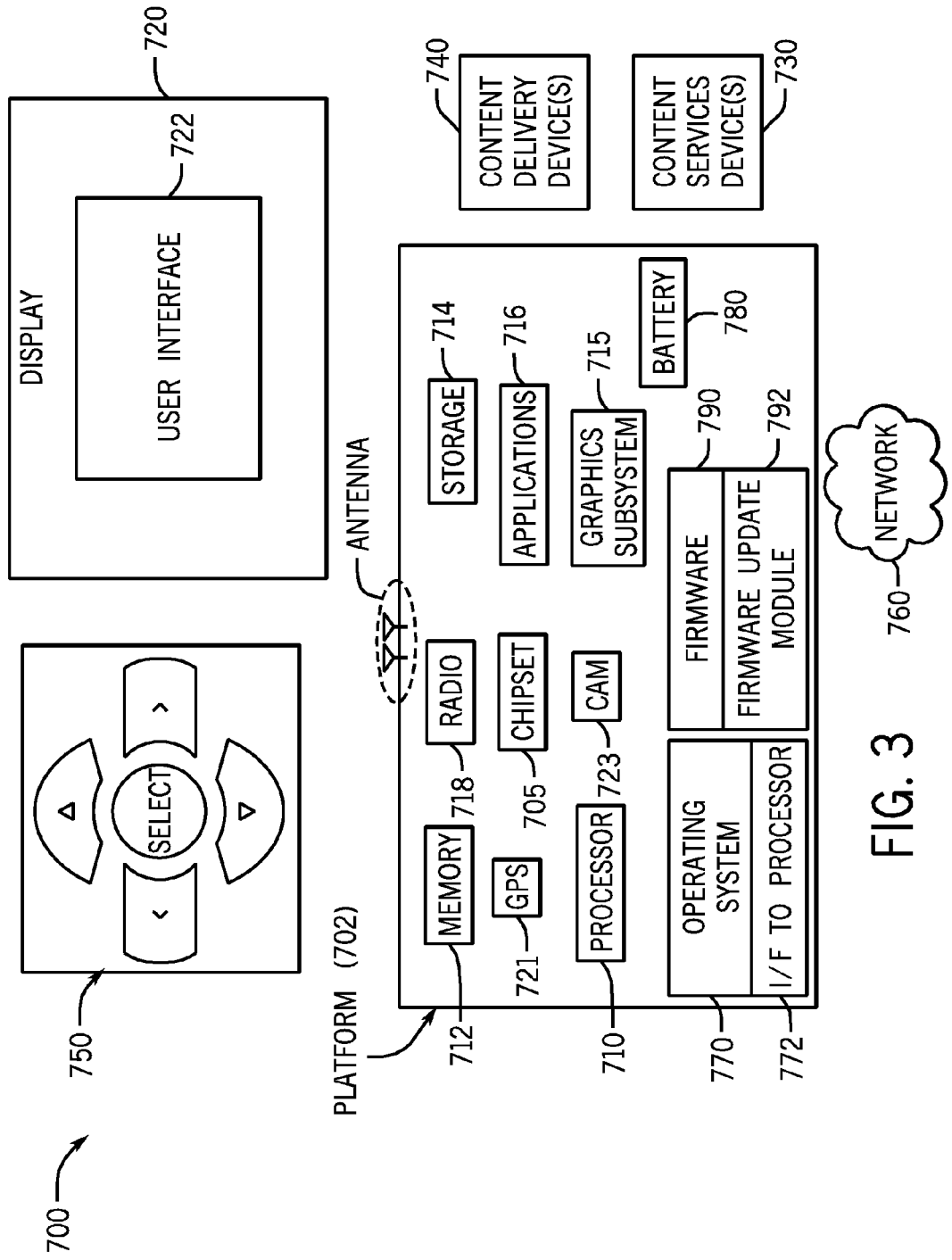
FIG. 3 is a system depiction for one embodiment to the present invention.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 2 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
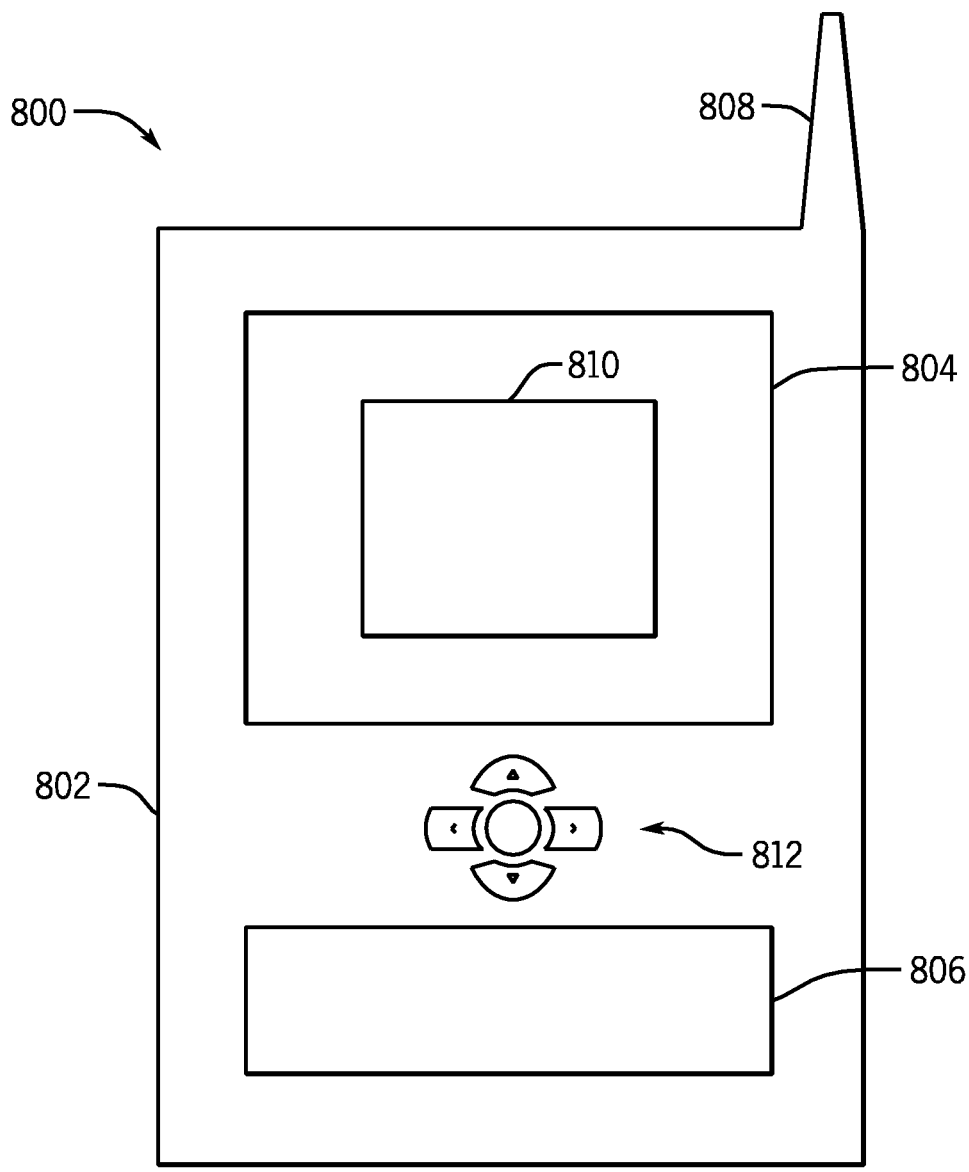
FIG. 4 is a front elevational view for one embodiment of the present invention.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    analyzing workloads of resources within a graphics processing unit;
    providing a first clock signal at a first frequency to one resource of the graphics processing unit;
    generating a second clock signal of a second frequency, different from said first frequency, from the first clock signal using clock edge skipping;
    sending the second clock signal to a different resource of the graphics processing unit; and
    rebalancing workloads among those resources.

2. The method of claim 1 including checking whether resource utilization drops below a threshold.

3. The method of claim 2 including, if resource utilization drops below the threshold, reducing a resource's local frequency.

4. The method of claim 3 including checking whether overall power dissipation dropped due to reducing the resource's local frequency.

5. The method of claim 4 including, if overall power dissipation dropped, raising clock frequencies of a plurality of resources.

6. The method of claim 1 including analyzing workloads of one or more of three-dimensional fixed functions, pixel back-end, or compute slices.

7. One or more non-transitory computer readable media storing instructions to cause a processor to perform a sequence comprising:
    analyzing workloads of components within a graphics processing unit;
    providing a first clock signal at a first frequency to one resource of the graphics processing unit;
    generating a second clock signal of a second frequency, different from said first frequency, from the first clock signal using clock edge skipping;
    sending the second clock signal to a different resource of the graphics processing unit; and
    rebalancing workloads among those components.

8. The media of claim 7, the sequence further including checking whether component utilization drops below a threshold.

9. The media of claim 8, the sequence further including, if component utilization drops below the threshold, reducing a component's local frequency.

10. The media of claim 9, the sequence further including checking whether overall power dissipation dropped due to reducing the component's local frequency.

11. The media of claim 10, the sequence further including, if overall power dissipation dropped, raising clock frequencies of a plurality of components.

12. The media of claim 7, the sequence further including analyzing workloads of one or more of three-dimensional fixed function, pixel back-end, or compute slice components.

13. A graphics processor comprising:
    a first resource;
    a second resource; and
    a unit to analyze utilization of said resources, to provide a first clock signal at a first frequency to one resource of the graphics processing unit, to generate a second clock signal of a second frequency, different from said first frequency, from the first clock signal using clock edge skipping, and to send the second clock signal to a different resource of the graphics processing unit; and
    to rebalance workloads between said resources.

14. The graphics processor of claim 13, said graphics processor to check whether resource utilization drops below a threshold.

15. The graphics processor of claim 14, if resource utilization drops below the threshold, said graphics processor to reduce a resource's local frequency.

16. The graphics processor of claim 15, said graphics processor to check whether overall power dissipation dropped due to reducing the resource's local frequency.

17. The graphics processor of claim 16, if overall power dissipation dropped, said graphics processor to raise clock frequencies of said resources.

18. The graphics processor of claim 13, said graphics processor to analyze workloads of one or more of a three-dimensional fixed function, a pixel back-end, or a computer slice.

19. A system comprising:
    a central processing unit;
    a graphics processor coupled to said central processing unit, said graphics processor including a first resource, a second resource and a device to analyze utilization of said resources, to provide a first clock signal at a first frequency to one resource of the graphics processing unit, to generate a second clock signal of a second frequency, different from said first frequency, from the first clock signal using clock edge skipping, and to send the second clock signal to a different resource of the graphics processing unit; and
    to rebalance workloads between said resources.

20. The system of claim 19 including an operating system.

21. The system of claim 19 including a battery.

22. The system of claim 19 including firmware and a module to update said firmware.

* * * * *